(12) United States Patent
Aud

(10) Patent No.: US 12,434,615 B2
(45) Date of Patent: Oct. 7, 2025

(54) RAMP HOLDING ASSEMBLY

(71) Applicant: Bryn Aud, Fordsville, KY (US)

(72) Inventor: Bryn Aud, Fordsville, KY (US)

( * ) Notice: Subject to any disclaimer, the term of this patent is extended or adjusted under 35 U.S.C. 154(b) by 412 days.

(21) Appl. No.: 18/088,048

(22) Filed: Dec. 23, 2022

(65) Prior Publication Data
US 2024/0208390 A1    Jun. 27, 2024

(51) Int. Cl.
*B60P 1/43* (2006.01)

(52) U.S. Cl.
CPC .................. *B60P 1/435* (2013.01)

(58) Field of Classification Search
CPC .. B60P 1/435; B60P 1/433; B60P 1/43; B60P 1/6454; B60P 7/0807; B62D 33/0207; B62D 33/0273; B62D 33/03; B62D 33/033
USPC .................. 296/1.07, 40; 410/101, 104, 106
See application file for complete search history.

(56) References Cited

U.S. PATENT DOCUMENTS

| | | | |
|---|---|---|---|
| 3,623,690 A * | 11/1971 | Bargman, Jr. ........ | B60P 7/0807 410/116 |
| 3,756,440 A | 9/1973 | Raap | |
| D418,451 S * | 1/2000 | Konecheck .................. | D12/101 |
| 6,722,721 B2 | 4/2004 | Sherrer | |
| 7,445,268 B2 | 11/2008 | Faulkiner | |
| 8,827,343 B2 * | 9/2014 | Peters .................... | B62D 33/04 296/61 |
| 10,351,039 B2 * | 7/2019 | Shaffer ...................... | B60P 7/08 |
| 10,414,447 B2 * | 9/2019 | Sauter ................ | B62D 33/0273 |
| 10,676,144 B2 * | 6/2020 | Barnes ................. | B62D 63/064 |
| 10,829,165 B1 * | 11/2020 | Poole ........................ | B60R 9/06 |
| 11,117,507 B2 * | 9/2021 | Teodorof .............. | B60P 1/6409 |
| 11,230,326 B2 * | 1/2022 | Elder ................. | B62D 33/0222 |
| 11,618,363 B1 * | 4/2023 | Boykin, Sr. .......... | B62D 33/033 296/186.5 |
| 2008/0292438 A1 | 11/2008 | Patterson | |
| 2014/0064896 A1 | 3/2014 | Parmar | |
| 2014/0375019 A1 * | 12/2014 | Bermes ................ | B62D 63/062 280/423.1 |
| 2021/0155145 A1 * | 5/2021 | Marchlewski ....... | B62D 33/023 |

FOREIGN PATENT DOCUMENTS

DE    102015109937    12/2015

* cited by examiner

*Primary Examiner* — Joseph D. Pape
*Assistant Examiner* — Veronica M Condo

(57) ABSTRACT

A ramp holding assembly includes a pair of support brackets that each has an elongate portion which is insertable into a stake pocket in a bed of a truck for securing the support brackets to the bed. Each of the support brackets has a hooked portion curving laterally away from the elongate portion and curving downwardly from the elongate portion. In this way a ramp can be suspended on the hooked portion for storing the ramp when the elongate portion is inserted into the stake pocket.

8 Claims, 3 Drawing Sheets

RAMP HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holding devices and more particularly pertains to a new holding device for holding a ramp for storage in a bed of a truck. The device includes support brackets that comprise an elongate portion that is insertable into a stake pocket in a bed of a truck and a hooked portion that extends into the bed. A ramp can be suspended on the hooked portion of each of the support brackets to store the ramp.

(2) Description of Related Art Including Information Disclosed Under 37 CFR 1.97 and 1.98

The prior art relates to holding devices including a tailgate that includes a rod and a pair of ramps pivotally coupled to the rod. The prior art discloses a foldable ramp device that is mounted on a bed of a truck and which can be folded into a tailgate. The prior art discloses a truck ramp device that includes a pair of ramps slidably attached to a bed of a truck and which can be stored beneath the bed. The prior art discloses a foldable ramp that is attached to a bed of a truck. The prior art discloses a ramp storage system that includes a housing integrated into a bed of a truck and a ramp that can be stored on the housing.

BRIEF SUMMARY OF THE INVENTION

An embodiment of the disclosure meets the needs presented above by generally comprising a pair of support brackets that each has an elongate portion which is insertable into a stake pocket in a bed of a truck for securing the support brackets to the bed. Each of the support brackets has a hooked portion curving laterally away from the elongate portion and curving downwardly from the elongate portion. In this way a ramp can be suspended on the hooked portion for storing the ramp when the elongate portion is inserted into the stake pocket.

An additional embodiment of the disclosure comprises a truck that has a bed which has a plurality of stake pockets. A ramp is included and a pair of support brackets is included that each has an elongate portion which is insertable into a respective stake pocket in the bed of the truck for securing the support brackets to the bed. Each of the support brackets has a hooked portion extending laterally away from the elongate portion and extending downwardly from the elongate portion. In this way the ramp can be suspended on the hooked portion for storing the ramp when the elongate portion is inserted into the stake pocket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
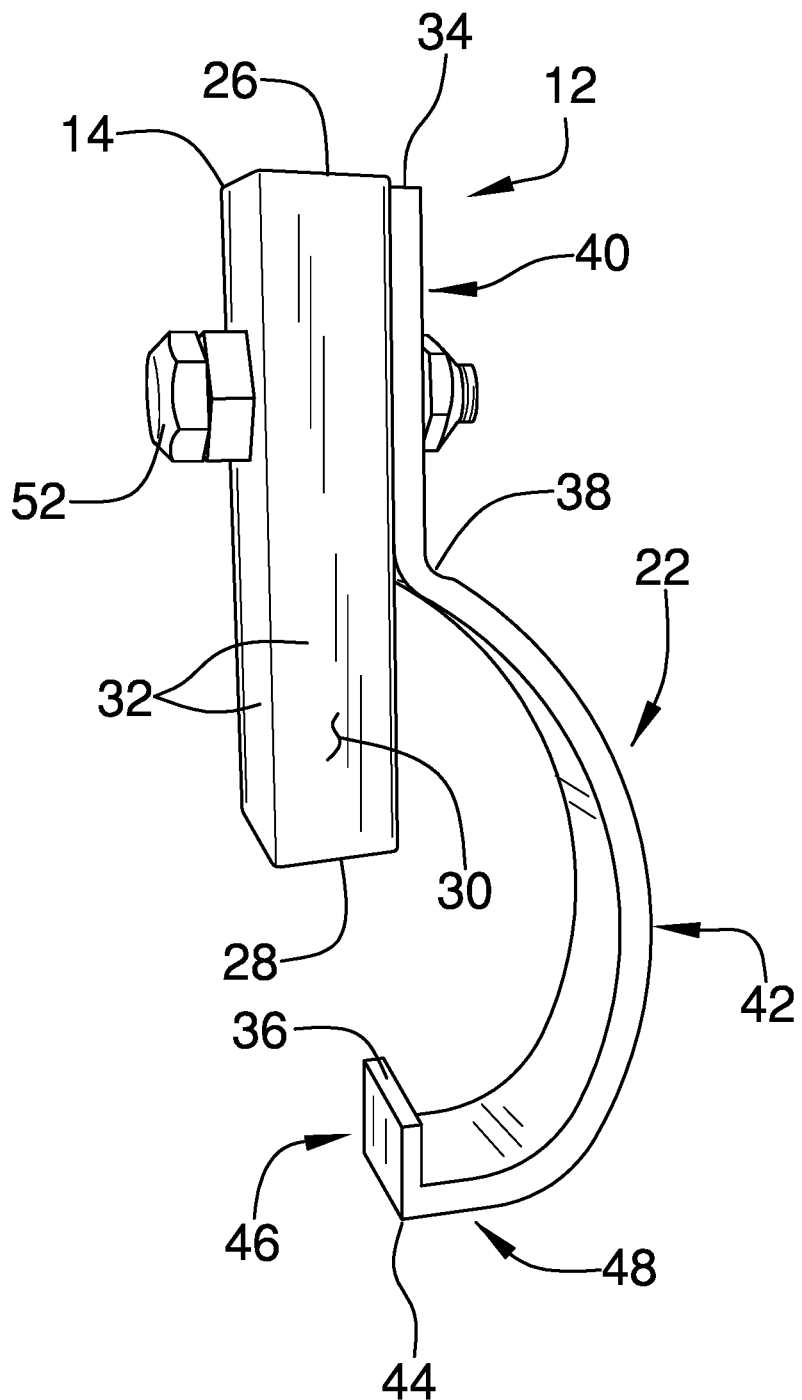
FIG. 1 is a front perspective view of a ramp holding assembly according to an embodiment of the disclosure.
Figure 2:
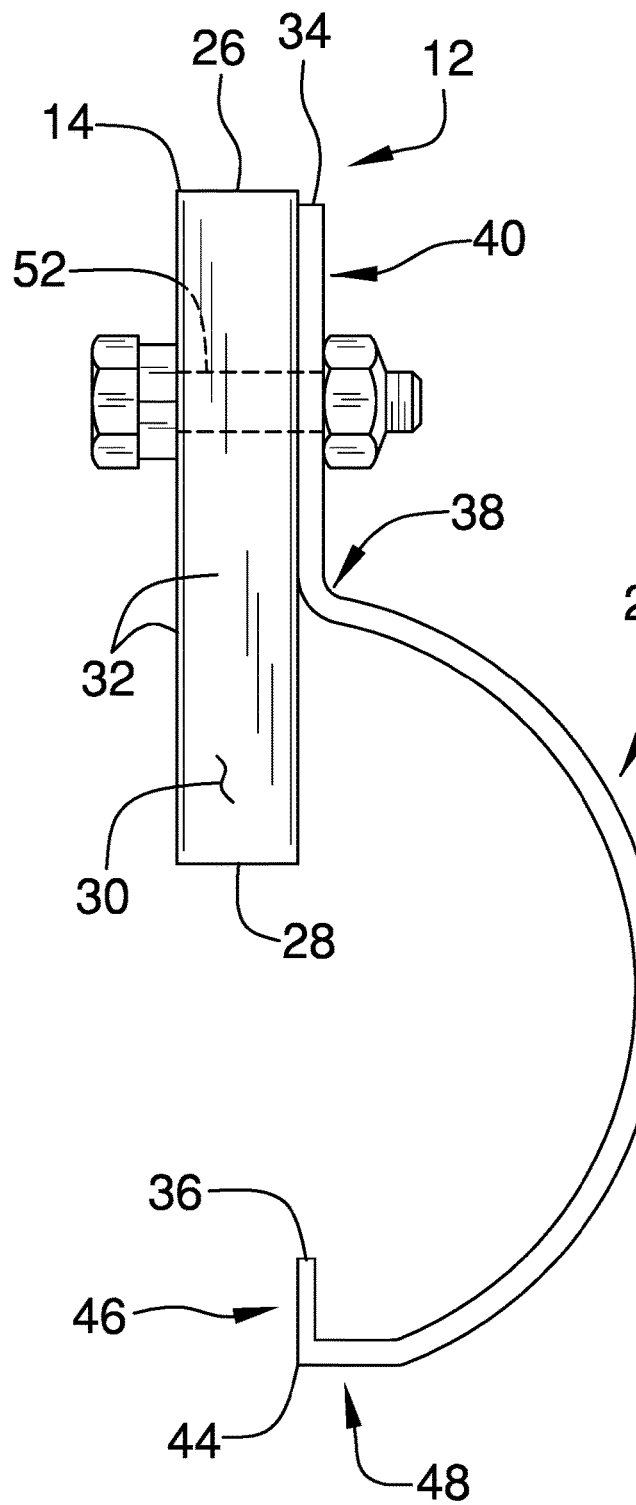
FIG. 2 is a front view of an embodiment of the disclosure.
Figure 3:
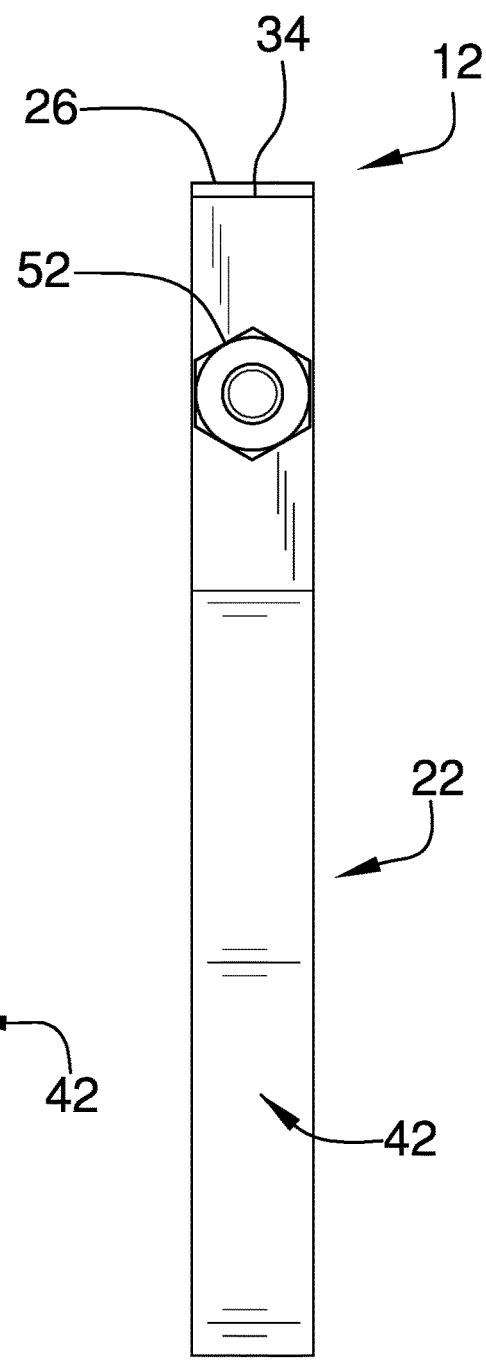
FIG. 3 is a left side view of an embodiment of the disclosure.
Figure 4:
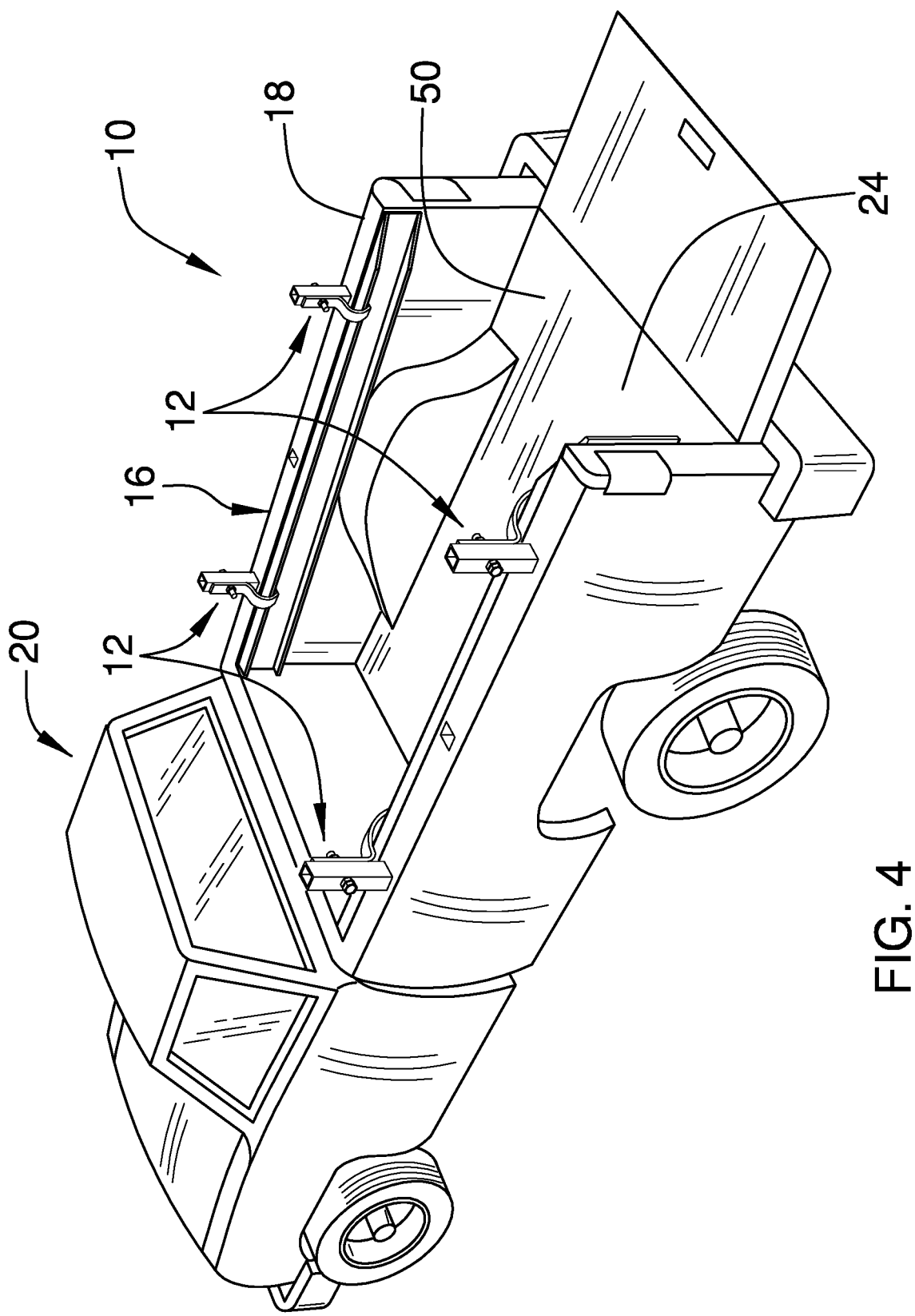
FIG. 4 is a perspective in-use view of an embodiment of the disclosure.

With reference now to the drawings, and in particular to FIGS. 1 through 4 thereof, a new holding device embodying the principles and concepts of an embodiment of the disclosure and generally designated by the reference numeral 10 will be described.

As best illustrated in FIGS. 1 through 4, the ramp holding assembly 10 generally comprises a pair of support brackets 12 that each has an elongate portion 14 that is insertable into a stake pocket 16 in a bed 18 of a truck 20 for securing the support brackets 12 to the bed 18. The truck 20 may be a pickup truck, for example, or other cargo vehicle with a bed that has stake pockets. Each of the support brackets 12 has a hooked portion 22 curving laterally away from the elongate portion 14 and curving downwardly from the elongate portion 14. In this way a ramp 24 can be suspended on the hooked portion 22 for storing the ramp 24 when the elongate portion 14 is inserted into the stake pocket 16. The ramp 24 may be a steel ramp commonly employed for loading wheeled equipment, such as a riding lawn mower for example, into the bed 18 of the truck 20.

The elongate portion 14 of each of the support brackets 12 has a top end 26, a bottom end 28 and an outer surface 30 extending between the top end 26 and the bottom end 28. The outer surface 30 has a plurality of intersecting sides 32 such that the elongate portion 14 has a rectangular shape thereby facilitating the elongate portion 14 to conform to the shape of the stake pocket 16. In this way the elongate portion 14 is inhibited from rotating in the stake pocket 16. The hooked portion 22 has a first bend 38 that is located closer to the first end 34 than the second end 36 to define a first section 40 of the hooked portion 22 that is oriented at an angle with a second section 42 of the hooked portion 22. The first end 34 is associated with the first section 40 and the second end 36 is associated with the second section 42.

The first section 40 lies flat against a respective one of the intersecting sides 32 of the outer surface 30 of the elongate portion 14 of the support bracket having the first section 40 extending substantially between the top end 26 and the bottom end 28 of the elongate portion 14. The first end 34 is positioned adjacent to the top end 26 of the elongate portion 14 and the second section 42 curves laterally away from the respective intersecting side 32 of the outer surface 30. The second section 42 extends beyond the bottom end 28 of the elongate portion 14. The second section 42 has a second bend 44 that is spaced from the second end 36 to define a foot 46 extending toward the first section 40.

The second portion 42 has a planar section 48 which intersects the second bend 44 having the planar section 48 lying on a plane that is perpendicularly oriented with an axis extending between the top end 26 and the bottom end 28 of the elongated portion 14. In this way the foot 46 can be extended through the ramp 24 having the ramp 24 resting on the planar section 48. Thus, the ramp 24 does not lie on a floor 50 of the bed 18 when the ramp 24 is not being used thereby maximizing available cargo space of the bed 18.

A fastener 52 extends through the first section 40 of the hooked portion 22 and extends through the outer surface 30 of the elongate portion 14 for attaching the hooked portion 22 to the elongate portion 14. The fastener 52 is centrally positioned between the first end 34 of the hooked portion 22 and the first bend 38 of the hooked portion 22. The fastener 52 may comprise a nut and a bolt or other type of releasable, mechanical fastener.

In use, the elongate portion 14 of each of the support brackets 12 is inserted into a respective pair of stake pockets 16 in the bed 18 of the truck 20. Each of the support brackets 12 is positioned on a common side of the bed 18 thereby facilitating the ramp 24 to be suspended on the hooked portion 22 of each of the support brackets 12. In this way the ramp 24 can be stored without occupying space on the floor 50 of the bed 18. Additionally, the ramp 24 can be removed from each of the support brackets 12 without requiring a user to climb into the bed 18 of the truck 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ramp holding assembly for storing a ramp in a bed of a truck, said assembly comprising:
   a pair of support brackets, each of said support brackets having an elongate portion being insertable into a stake pocket in the bed of the truck for securing said support brackets to the bed, each of said support brackets having a hooked portion curving laterally away from said elongate portion and curving downwardly from said elongate portion thereby facilitating the ramp to be suspended on said hooked portion for storing the ramp when said elongate portion is inserted into the stake pocket;
   said elongate portion of each of said support brackets has a top end, a bottom end and an outer surface extending between said top end and said bottom end, said outer surface having a plurality of intersecting sides such that said elongate portion has a rectangular shape thereby facilitating said elongate portion to conform to the shape of the stake pocket such that said elongate portion is inhibited from rotating in the stake pocket;
   said hooked portion of each of said support brackets has a first end and a second end, said hooked portion being elongated between said first end and said second end, said hooked portion having a first bend being located closer to said first end than said second end to define a first section of said hooked portion being oriented at an angle with a second section of said hooked portion, said first end being associated with said first section, said second end being associated with said second section; and
   said first section lies flat against a respective one of said intersecting sides of said outer surface of said elongate portion of said support bracket having said first section extending substantially between said top end and said bottom end of said elongate portion.

2. The assembly according to claim 1, wherein said first end of said hooked portion is positioned adjacent to said top end of said elongate portion.

3. The assembly according to claim 1, wherein said second section curves laterally away from said respective intersecting side of said outer surface, said second section extending beyond said bottom end of said elongate portion.

4. The assembly according to claim 1, wherein said second section has a second bend being spaced from said second end to define a foot extending toward said first section.

5. The assembly according to claim 4, wherein said second portion has a planar section which intersects said second bend having said planar section lying on a plane being perpendicularly oriented with an axis extending between said top end and said bottom end of said elongated portion thereby facilitating said foot to be extended through the ramp having the ramp resting on said planar section.

6. The assembly according to claim 1, further comprising a fastener extending through said first section of said hooked portion and extending through said outer surface of said elongate portion for attaching said hooked portion to said elongate portion, said fastener being centrally positioned between said first end of said hooked portion and said first bend in said hooked portion.

7. A ramp holding assembly for storing a ramp in a bed of a truck, said assembly comprising:
  a pair of support brackets, each of said support brackets having an elongate portion being insertable into a stake pocket in the bed of the truck for securing said support brackets to the bed, each of said support brackets having a hooked portion extending laterally away from said elongate portion and extending downwardly from said elongate portion thereby facilitating the ramp to be suspended on said hooked portion for storing the ramp when said elongate portion is inserted into the stake pocket, said elongate portion of each of said support brackets having a top end, a bottom end and an outer surface extending between said top end and said bottom end, said outer surface having a plurality of intersecting sides such that said elongate portion has a rectangular shape thereby facilitating said elongate portion to conform to the shape of the stake pocket such that said elongate portion is inhibited from rotating in the stake pocket, said hooked portion of each of said support brackets having a first end and a second end, said hooked portion being elongated between said first end and said second end, said hooked portion having a first bend being located closer to said first end than said second end to define a first section of said hooked portion being oriented at an angle with a second section of said hooked portion, said first end being associated with said first section, said second end being associated with said second section, said first section lying flat against a respective one of said intersecting sides of said outer surface of said elongate portion of said support bracket having said first section extending substantially between said top end and said bottom end of said elongate portion, said first end being positioned adjacent to said top end of said elongate portion, said second section curving laterally away from said respective intersecting side of said outer surface, said second section extending beyond said bottom end of said elongate portion, said second section having a second bend being spaced from said second end to define a foot extending toward said first section, said second portion having a planar section which intersects said second bend having said planar section lying on a plane being perpendicularly oriented with an axis extending between said top end and said bottom end of said elongated portion thereby facilitating said foot to be extended through the ramp having the ramp resting on said planar section; and
  a fastener extending through said first section of said hooked portion and extending through said outer surface of said elongate portion for attaching said hooked portion to said elongate portion, said fastener being centrally positioned between said first end of said hooked portion and said first bend in said hooked portion.

8. A ramp holding system for storing a ramp in a bed of a truck, said system comprising:
  of the truck having the bed, said bed having a plurality of stake pockets;
  the ramp;
  a pair of support brackets, each of said support brackets having an elongate portion being insertable into one of the stake pockets in the bed of the truck for securing said support brackets to the bed, each of said support brackets having a hooked portion extending laterally away from said elongate portion and extending downwardly from said elongate portion thereby facilitating a ramp the ramp to be suspended on said hooked portion for storing the ramp when said elongate portion is inserted into the stake pocket, said elongate portion of each of said support brackets having a top end, a bottom end and an outer surface extending between said top end and said bottom end, said outer surface having a plurality of intersecting sides such that said elongate portion has a rectangular shape thereby facilitating said elongate portion to conform to the shape of the stake pocket such that said elongate portion is inhibited from rotating in the stake pocket, said hooked portion of each of said support brackets having a first end and a second end, said hooked portion being elongated between said first end and said second end, said hooked portion having a first bend being located closer to said first end than said second end to define a first section of said hooked portion being oriented at an angle with a second section of said hooked portion, said first end being associated with said first section, said second end being associated with said second section, said first section lying flat against a respective one of said intersecting sides of said outer surface of said elongate portion of said support bracket having said first section extending substantially between said top end and said bottom end of said elongate portion, said first end being positioned adjacent to said top end of said elongate portion, said second section curving laterally away from said respective intersecting side of said outer surface, said second section extending beyond said bottom end of said elongate portion, said second section having a second bend being spaced from said second end to define a foot extending toward said first section, said second portion having a planar section which intersects said second bend having said planar section lying on a plane being perpendicularly oriented with an axis extending between said top end and said bottom end of said elongated portion thereby facilitating said foot to be extended through the ramp having the ramp resting on said planar section; and
  a fastener extending through said first section of said hooked portion and extending through said outer surface of said elongate portion for attaching said hooked portion to said elongate portion, said fastener being centrally positioned between said first end of said hooked portion and said first bend in said hooked portion.

* * * * *